A. EDWARDS.
TURNING DEVICE FOR AUTO HEADLIGHTS.
APPLICATION FILED MAR. 27, 1920.
1,369,917.
Patented Mar. 1, 1921.
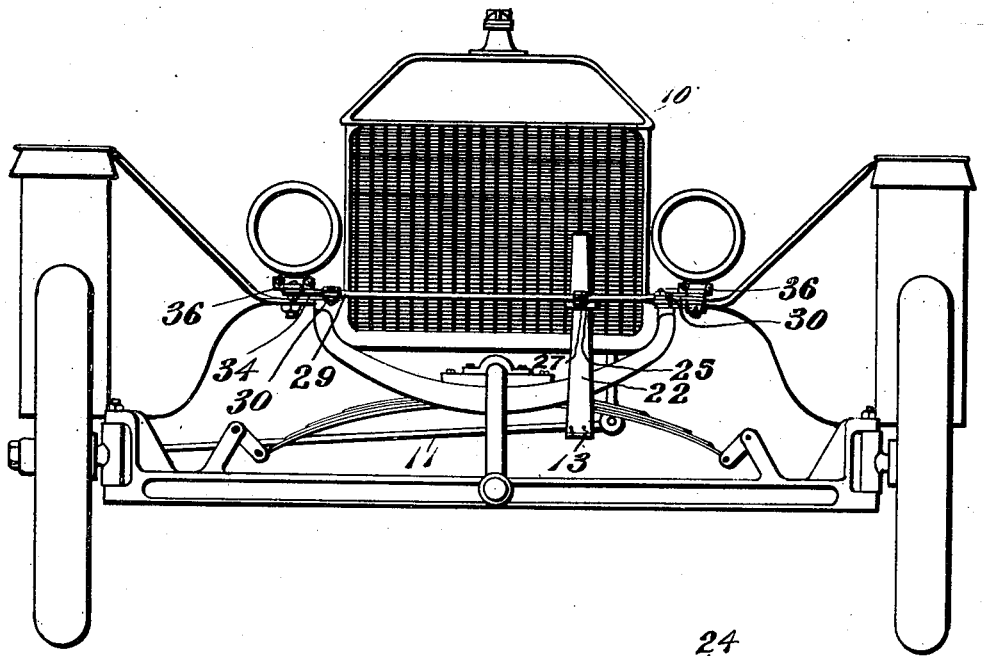
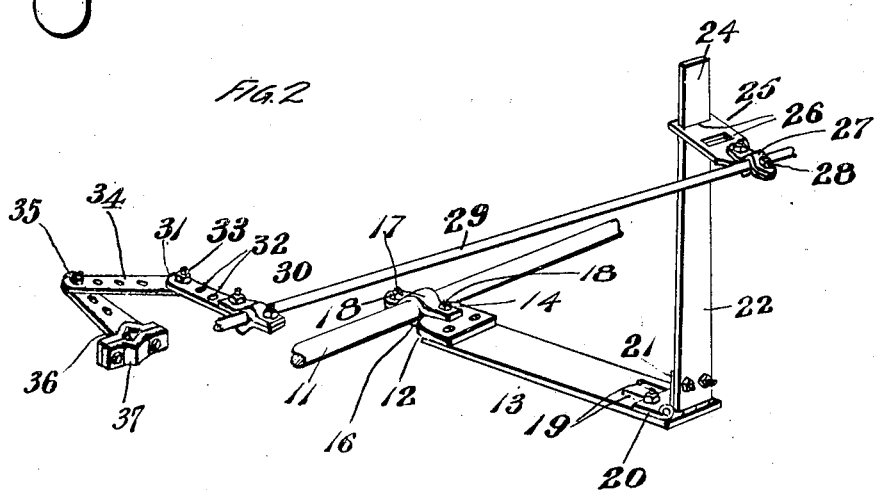
INVENTOR
ARTHUR EDWARDS
By Edward E. Longan
ATTY

UNITED STATES PATENT OFFICE.

ARTHUR EDWARDS, OF ST. LOUIS, MISSOURI.

TURNING DEVICE FOR AUTO-HEADLIGHTS.

1,369,917.  Specification of Letters Patent.  Patented Mar. 1, 1921.

Application filed March 27, 1920. Serial No. 369,188.

*To all whom it may concern:*

Be it known that I, ARTHUR EDWARDS, a citizen of the United States, and resident of the city of St. Louis and State of Missouri, have invented certain new and useful Improvements in Turning Devices for Auto-Headlights, of which the following is a specification containing a full, clear, and exact description, references being had to accompanying drawings, forming a part thereof.

My invention relates to improvements in turning devices for automobile headlights, and has for its primary object a lever mechanism interposed between the steering mechanism and the headlights of an automobile, whereby the headlights are turned so as to follow the wheel path.

A further object is to construct a turning device for automobile headlights of a series of levers hingedly connected together, and which are connected to the steering mechanism, and the headlights of an automobile, so that the lights are operated simultaneously with the movement of the steering gear. In other words the lights will be turned in the same direction that the front wheels of the machine are, and so only light up the path of travel of the machine.

In the drawings;

Figure 1 is a front elevation of my device attached to an automobile.

Fig. 2 a fragmental perspective view showing a portion of my device attached to the steering rod of a machine.

In the construction of my device I make use of the ordinary steering wheel of an automobile 10. To the steering bar 11 is attached the clamp 12, this clamp being secured to the horizontal shifting member 13 by means of bolts, which extend through the openings 14 formed in the clamps 12 and 15 formed in the horizontal shifting member 13.

This clamp is provided with a recessed portion 16 and the cap 17, which cap is secured by means of bolts 18 so that it can be securely clamped to the steering rod 11. The horizontal shifting member 13 is provided on the end opposite that in which the openings 15 are located with slots 19 and in these slots is slidably mounted one end of a hinge 20. The opposite end 21 of this connection is secured to the upright shifting member 22 by means of bolts which pass through the openings 23 formed therein. Over the end 24 of the upright shifting member is slipped the clamping member 25, which has slotted openings 26 formed therein; the object of these openings being so that the clamping member 25 can be adjusted to and from the upright shifting member.

The clamp 25 is provided with a cap 27, which cap is secured thereto by means of bolts 28 so that it can be securely bound or clamped to the rod 29; this rod 29 extending across the front of the machine and is shifted backward and forward according to the movement imparted to the steering rod 10.

Secured to the rod 29 are a pair of clamps 30, which clamps have their ends 31 provided with a plurality of bolt openings 32; these openings being to permit the insertion of the bolts 33, which secure one end of the link 34 thereto.

The other end of the link 34 is secured to the end 35 of the clamping member 36, which member is provided with a cap 37 so that it can be secured to the standard or support of an automobile headlight.

The end 35 of the clamping member 36 as well as the link 34 is provided with a plurality of openings to permit the insertion of a bolt and also a relative amount of adjustment.

In assembling my device and attaching it to a machine, the clamp 12 is first secured to the horizontal shifting member 13 by means of bolts passing through the openings 14 and 15, and the portion or cap 17 secured over the steering rod 11. The portion 21 of the hinge member is secured to the upright shifting bar by means of bolts, and the lower portion 20 secured in the slots 19 of the horizontal shifting member 13. Before the last mentioned member or portion 20 is secured, the bar is adjusted in the slots 19 so that it will clear the radiator. The clamp 25 is then slipped over the upright shifting member 22, this shifting member being inserted through one of the slots 26.

The clamps 30 are secured to the rod 29. Each rod is then secured in the clamping member 25 by means of the cap 27 and the bolts 28. The clamping member 36 is then fastened to the supporting bar of each automobile headlight; and the end 35 thereof projecting rearward from the supporting bar of the headlight connected to the end 31 of the clamping member 30 by means of the link 34. This connection is the same for both of the headlights.

Before the clamp 25 is securely fastened to the bar 29 the wheels are turned so as to direct the machine straight forward.

The lights are then turned to the same position and the clamp 25 is then secured.

In this way and by my connection of levers and shifting members, the lights will turn in whatever direction the wheels are turned.

My object in mounting the clamp 25 slidably upon the upright shifting bar 22 is so that a certain amount of lateral movement is allowed, due to the action of the springs in passing over a rough road.

In a rigid connection between the shifting bar 21 and the clamp 25 this would not be possible, and would cause undue strain on the several parts.

The object of hingedly connecting the upright shifting bar 22 to the horizontal shifting bar 13 is that both rods 29 and 11 have a shifting movement, but the bar 11 traveling to and from the axle as the wheels are turned, and the bar 29 to and from the radiator as the lights are turned, this movement not being wholly due to the difference in length of the levers causing this turning, one of the bars will have a greater movement to and from the parts mentioned than the other, and this hinged connection will take care of this movement.

Having fully described my invention, what I claim is:

1. In a turning device for auto headlights comprising in combination with a steering rod of an automobile, of a horizontal shifting member secured thereto, a vertical shifting member hingedly secured to the horizontal shifting member, a clamp slidably secured to the vertical shifting member, a rod rigidly clamped in the slidably mounted clamp, a rearwardly extending clamping member secured near each end of the last mentioned rod, a second clamping member secured to the lamp support and extending rearwardly therefrom, and a link for connecting said last mentioned clamping members swivelly together, said clamping members and links having a plurality of openings for adjusting the amount of turn given to the lamps.

2. In a turning device for auto headlights comprising in combination with a steering rod of an automobile, of a horizontal shifting member secured thereto, a vertical shifting member hingedly secured to the horizontal shifting member, a clamp slidably secured to the vertical shifting member, a rod rigidly clamped in the slidably mounted clamp, a clamping member having a rearward extension secured to each end of the last mentioned rod, a second clamping member secured to the lamp support and extending rearwardly therefrom, and a link for connecting said last mentioned clamping members together.

3. A turning device for auto headlights comprising in combination with the steering rod of an automobile, of a clamp secured thereto, a horizontal shifting member having one end thereof secured to the clamp, a hinge secured to the opposite end of the shifting member, a vertical member secured to the hinge, a clamp slidably secured to the vertical member, a rod rigidly clamped in said slidably mounted clamp, a clamp secured to each end of the last mentioned rod, a rearwardly extending perforated extension formed integral with said clamp, a clamping member secured to a lamp support and extending rearwardly therefrom, a perforated extension formed integral with said clamping member, and a link for connecting said clamping members together, said links having a plurality of openings for adjusting the lamps.

In testimony whereof, I have signed my name to this specification, in presence of two subscribing witnesses.

ARTHUR EDWARDS.

Witnesses:
E. M. SCHUCHARDT,
W. C. STEIN.